United States Patent
She

(10) Patent No.: US 10,234,861 B2
(45) Date of Patent: Mar. 19, 2019

(54) AUTONOMOUS VEHICLE WORKLOAD ALLOCATION

(71) Applicant: Ford Global Technologies, LLC, Dearborn, MI (US)

(72) Inventor: Eric She, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 15/213,501

(22) Filed: Jul. 19, 2016

(65) Prior Publication Data
US 2018/0024552 A1    Jan. 25, 2018

(51) Int. Cl.
G05D 1/00    (2006.01)
B60W 50/00    (2006.01)

(52) U.S. Cl.
CPC ....... *G05D 1/0077* (2013.01); *B60W 50/0098* (2013.01); *G05D 1/0088* (2013.01); *B60W 2510/085* (2013.01); *B60W 2540/26* (2013.01); *B60W 2550/12* (2013.01); *B60W 2550/20* (2013.01); *B60W 2550/402* (2013.01); *B60W 2600/00* (2013.01)

(58) Field of Classification Search
CPC .............. G05D 1/0077; G05D 1/0088; B60W 50/0098
USPC .......................................................... 701/23
See application file for complete search history.

(56) References Cited

U.S. PATENT DOCUMENTS

| | | |
|---|---|---|
| 4,956,777 A | 9/1990 | Cearley et al. |
| 5,195,040 A | 3/1993 | Goldsmith |
| 7,415,331 B2 * | 8/2008 | Dapp ...................... G01C 21/12 |
| | | 701/117 |
| 7,669,087 B1 | 2/2010 | Johnsen et al. |
| 8,452,465 B1 | 5/2013 | Sinha et al. |
| 2010/0305792 A1 | 12/2010 | Wilk et al. |
| 2013/0282946 A1 | 10/2013 | Ricci |
| 2015/0224845 A1 * | 8/2015 | Anderson ............ B60G 17/019 |
| | | 701/37 |
| 2016/0272219 A1 | 9/2016 | Ketfi-Cherif et al. |

(Continued)

FOREIGN PATENT DOCUMENTS

| | | |
|---|---|---|
| CN | 101916090 B | 8/2012 |
| EP | 2587330 A2 | 10/2012 |
| JP | H04372470 A | 12/1992 |

(Continued)

OTHER PUBLICATIONS

Frtunikj, Jelena et al, "Adaptive Error and Sensor Management for Autonomous Vehicles: Model-based Approach and Run-time System," Munchen, Germany, Dec. 2013.

(Continued)

*Primary Examiner* — Yazan A Soofi
(74) *Attorney, Agent, or Firm* — Frank A. MacKenzie; Bejin Bieneman PLC

(57) ABSTRACT

A vehicle system includes a first vehicle component at least partially controlling a vehicle action and a second vehicle component at least partially controlling the vehicle action. A coordination controller is programmed to coordinate control of the vehicle action. The coordination controller detects a first vehicle component failure, selects a vehicle mode, and allocates workloads of the first vehicle component and the second vehicle component according to the selected vehicle mode.

20 Claims, 2 Drawing Sheets

(56) References Cited

U.S. PATENT DOCUMENTS

2017/0210376 A1* 7/2017 Jain ...................... B60W 30/00

FOREIGN PATENT DOCUMENTS

| WO | 2005063524 A1 | 7/2005 |
| WO | 2015055914 A1 | 4/2015 |

OTHER PUBLICATIONS

Search Report dated Dec. 8, 2017 from the United Kingdom Intellectual Property Office regarding GB Application No. 1711314.3 (5 pages).

* cited by examiner

AUTONOMOUS VEHICLE WORKLOAD ALLOCATION

BACKGROUND

Many sophisticated vehicle systems incorporate some level of redundancy. Redundancy sometimes involves multiple power supplies providing power to a single device, multiple devices performing the same functions, etc. When one power supply or device fails, another may step in to temporarily maintain some amount of control over the vehicle.

DETAILED DESCRIPTION

Some subsystem failures can be mitigated by the driver assuming certain vehicle controls. For example, if the power steering fails, the driver can still manually control the steering wheel, although not as easily as with power steering. If the brakes fail, the driver may be able to manually engage the parking brake to generate some braking force.

Autonomous vehicles may not always have a human present to mitigate the types of subsystem failures discussed above. Even still, certain subsystem failures can be mitigated by a workload allocation system that coordinates subsystem workload. Thus, if one of the subsystems fails, the workload allocation system may reallocate the workload to accomplish the vehicle action to be performed by the failed subsystem according to goals associated with a particular vehicle mode. Thus, in one possible implementation, the workload allocation system includes a coordination controller programmed to coordinate control of the vehicle action by detecting a first vehicle subsystem failure, selecting a vehicle mode, and allocating workloads of the first vehicle subsystem and the second vehicle subsystem according to the selected vehicle mode.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
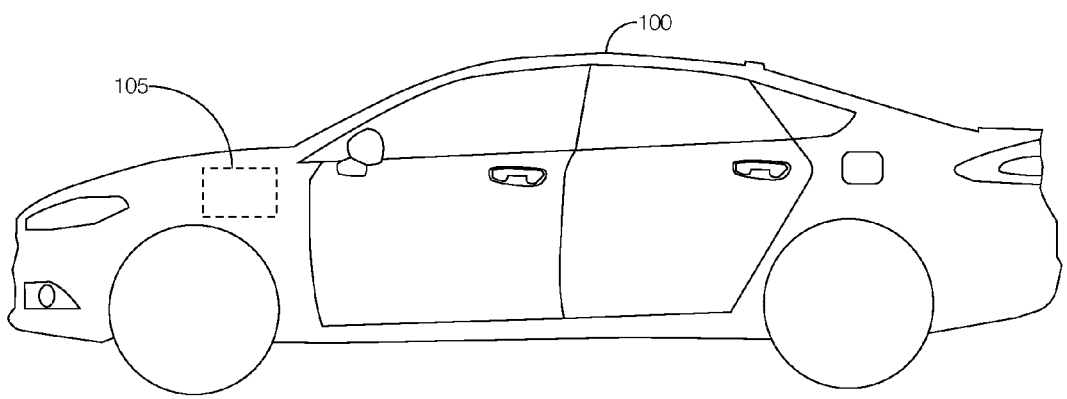
FIG. 1 illustrates an example vehicle with a workload allocation system for coordinating workload between multiple subsystems controlling the same vehicle action.

As illustrated in FIG. 1, an autonomous host vehicle 100 includes a workload allocation system 105 that coordinates the workload of various vehicle components to execute a particular vehicle action. For instance, the workload allocation system 105 may monitor performance of various vehicle components, detect a failure of one component, and command other components to adjust their workload to compensate for the failed component.

Although illustrated as a sedan, the host vehicle 100 may include any passenger or commercial automobile such as a car, a truck, a sport utility vehicle, a crossover vehicle, a van, a minivan, a taxi, a bus, etc. Further, the host vehicle 100 is an autonomous vehicle can operate in an autonomous (e.g., driverless) mode, a partially autonomous mode, and/or a non-autonomous mode.

The workload allocation system 105 may selectively monitor and coordinate components based on the vehicle action to be performed. For instance, if the vehicle action is steering, the workload allocation system 105 may select actuators, and their respective power supplies, associated with autonomously steering the host vehicle 100 for monitoring and coordination. Examples of such actuators may include the actuators involved with turning the steering wheel while the host vehicle 100 is operating in an autonomous or partially autonomous mode. If the vehicle action involves braking, the workload allocation system 105 may select actuators, and their respectively power supplies, associated with autonomously braking the host vehicle 100 for monitoring and coordination. Examples of such actuators include the actuators involved with applying the brakes while the host vehicle 100 is operating in an autonomous or partially autonomous mode. If the vehicle action involves accelerating, the workload allocation system 105 may select actuators, and their respective power supplies, associated with autonomously accelerating the host vehicle 100 for monitoring and coordination. Examples of such actuators include the actuators involved with moving the accelerator pedal while the host vehicle 100 is operating in an autonomous or partially autonomous mode.

Figure 2:
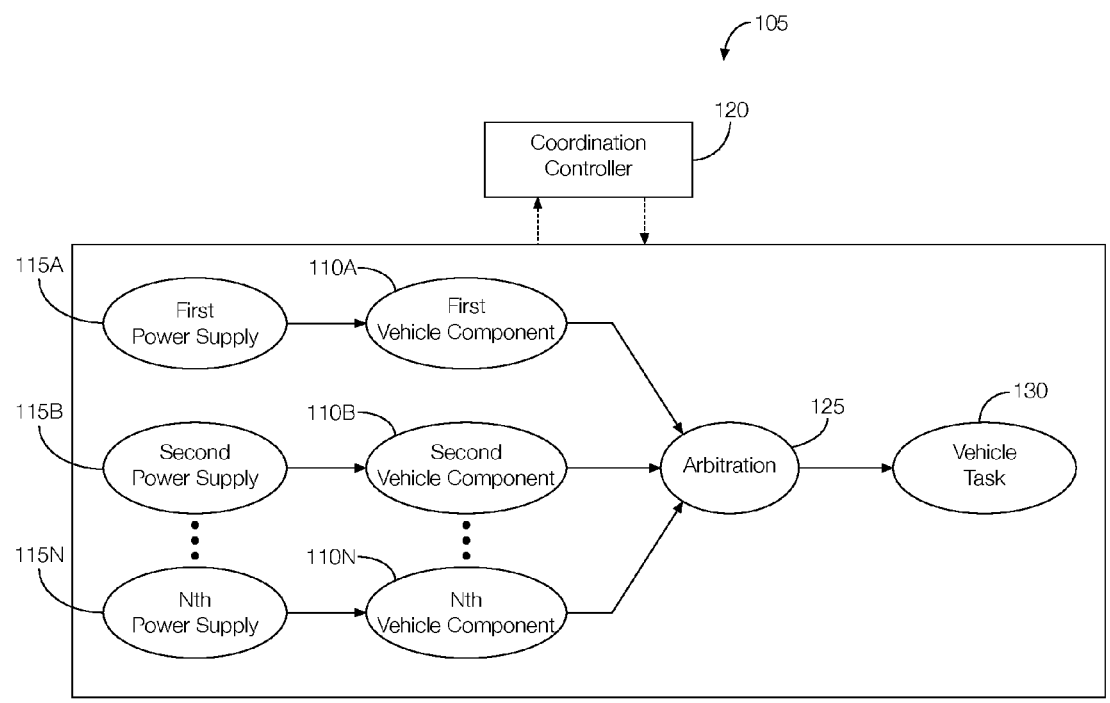
FIG. 2 is a block diagram showing example interactions among various components of the workload allocation system.

Referring now to FIG. 2, the workload allocation system 105, which interacts with multiple vehicle components 110 and power supplies 115, includes a coordination controller 120 and an arbitration block 125.

The components 110, as discussed above, may be various electrically powered actuators associated with controlling certain vehicle actions 130. In general, each actuator may receive an electrical control signal and move according to the electrical signal received. The movement of the actuator may be linear or circular. Examples of actuators may include powertrain actuators for controlling vehicle acceleration, steering actuators for controlling vehicle steering, braking actuators for controlling vehicle braking, etc. The components 110 may work alone or together to perform the vehicle action 130. The amount each component 110 contributes to the vehicle action 130 may be referred to as the workload of the component 110. The workload may be expressed as a percentage. Therefore, if two components 110 (e.g., a first component 110A and a second component 110B) equally contribute to performing the same vehicle action 130, the workload for each may be 50%. The workload for each component 110 may be based, at least in part, on the power capacity of the power supply 115 that electrically powers the component 110.

The power supplies 115 may each electrically power one or more of the components 110. Each power supply 115 may be electrically connected to, e.g., the vehicle battery. Moreover, each power supply 115 may include a DC-DC converter to step down the DC voltage received from the vehicle battery to an appropriate voltage for powering the respective component 110. The amount of energy stored in the power supply 115 may be referred to as the power capacity. The electrical power output to the component 110 may be based on the power capacity of the power supply 115. Each power supply 115 may supply electrical energy to one or more of the components 110. As shown in FIG. 2, a first power supply 115A provides electrical energy to the first component 110A while a second power supply 115B provides electrical energy to the second component 110B. The workload of the component 110 may be based, at least in part, on the power capacity of the power supply 115.

The coordination controller 120 is implemented via circuits, chips, or other electronic components 110 that can coordinate control of the vehicle action 130. The coordination controller 120 is programmed to detect failures associated with the components 110, the power supplies 115, or both. Examples of failures detectable by the coordination controller 120 include reduced workload of one or more components 110, reduced power capacity of one or more power supplies 115, etc. Therefore, detecting the failure may include monitoring the workload of the components 110, monitoring the power capability of the power supplies 115, and diagnosing the failure when the workload or power capacity is not as expected.

Detecting the failure may further include monitoring various internal vehicle conditions and various external vehicle conditions. As such, the coordination controller 120 may be programmed to monitor both internal and external vehicle conditions. Examples of internal vehicle conditions may include a driver condition, a vehicle traction capability, and a power capability. The driver condition may refer to the driver's ability to assume control certain vehicle actions 130 such as steering, braking, or accelerating. The vehicle traction capability may refer to the vehicle's ability to gain traction relative to the road surface. The power capability may refer to the ability of the vehicle battery and the power supplies 115 to provide appropriate electrical energy to the components 110. Examples of external vehicle conditions may include a traffic condition, an ambient temperature, and a distance to a destination. The traffic condition may refer to the number and average speed of vehicles on the road, construction or weather affecting travel on a particular roadway, etc. The ambient temperature may refer to the air temperature outside the host vehicle 100. The distance to the destination may refer to how far away the host vehicle 100 is from its intended destination.

To begin addressing the detected failure, the coordination controller 120 is programmed to select a vehicle mode. The vehicle mode may be selected according to a priority. Examples of priorities may include a performance priority, an efficiency priority, a safety priority, etc. Selecting the performance priority may include the coordination controller 120 being programmed to prioritize performance characteristics of the host vehicle 100. Performance characteristics may refer to how quickly the host vehicle 100 accelerates and decelerates, how well the host vehicle 100 performs cornering maneuvers, etc. When prioritizing performance, the coordination controller 120 may be programmed to output signals that seek to maintain the highest performance characteristics possible given the circumstances. Selecting the efficiency priority may include the coordination controller 120 being programmed to prioritize fuel efficiency, meaning that the coordination controller 120 may output control signals that command the components 110, power supplies 115, or both, to operate in a way that maximizes fuel economy or other energy usage. Selecting the safety priority may include the coordination controller 120 being programmed to prioritize moving the host vehicle 100 to the safest possible location given the circumstances, which may include a failed component 110 or power supply 115. Thus, when prioritizing safety, the coordination controller 120 may output signals to command the components 110 and power supplies 115 to operate in a limp-home mode, to attempt to move the host vehicle 100 out of traffic (e.g., to the side of the road), or the like.

The coordination controller 120 may be further programmed to allocate the workloads of the components 110 in real time, in accordance with the selected vehicle mode, when one or more of the components 110 fails. For instance, the coordination controller 120 may estimate or otherwise determine the workload of each component 110 dedicated to performing the vehicle action 130. If the workload of one component 110 (e.g., the first component 110A) is less than expected, the coordination controller 120 may determine that the first component 110A or first power supply 115A has failed. The coordination controller 120 may be programmed to reduce the workload of the failed component 110 while increasing the workload of other components 110 contributing to the same vehicle action 130, subject to certain constraints such as, e.g., the power capacities of the power supplies 115 of the failed and working components 110.

A failed component 110 may still be able to provide some output that contributes to performing the vehicle action 130. Therefore, the coordination controller 120 may be programmed to determine the workload that can be expected from the failed component 110, and allocate the workloads of the failed component 110 And other components 110 accordingly. By way of example, if the first component 110A and the second component 110B are each providing 50% of the workload for a particular vehicle action 130, and if the first component 110A fails, the coordination controller 120 may be programmed to determine how much, if any, workload the first component 110A can contribute and adjust the workloads of the first component 110A and the second component 110B accordingly. The coordination controller 120 may be programmed to determine how much the first component 110A can contribute according to various constraints including the power capacity of the first power supply 115A. If the coordination controller 120 determines that the first component 110A is only able to contribute 25% of the workload, the coordination controller 120 may be programmed to allocate 25% of the workload to the first component 110A and 75% of the workload to the second component 110B. If the coordination controller 120 determines that the first component 110A has failed completely, it may allocate 100% of the workload to the second component 110B. if the second component 110B is unable to provide 100% of the workload, the coordination controller 120 may be programmed to involve other components 110 capable of contributing to the vehicle action 130. Thus, the coordination controller 120 is programmed to allocate the workload according to the constraints of the components 110.

The coordination controller 120 may be programmed to consider the selected vehicle mode when determining how to allocate the workload. For instance, the coordination controller 120 may allocate resources (i.e., components 110 and power supplies 115) according to whether the coordination controller 120 selected the performance priority or the efficiency priority. That is, the coordination controller 120 may output control signals to the components 110 and power supplies 115 performing the vehicle action 130 that command those components 110 and power supplies 115 to operate according to the workload allocation.

Moreover, in one possible implementation, the coordination controller 120 may be programmed to select the vehicle mode according to the availability of certain components 110 and the type of vehicle action 130 to be performed. That is, if enough resources (i.e., components 110 and power supplies 115) are available to provide 100% workload for a particular vehicle action 130 after one component 110 fails, the coordination controller 120 may be programmed to select between the performance priority and the efficiency priority. If the coordination controller 120 cannot allocate enough resources (i.e., components 110 and power supplies 115) to provide 100% of the workload for an extended period of time, the coordination controller 120 may be programmed to select the safety priority, which as discussed above could include a limp home mode.

The arbitration block 125 is a summation block implemented via circuits, chips, or other electronic components that can combine the various workloads of the components 110. In one possible approach, the arbitration block 125 simply determines whether the collective components 110 are providing 100% of the workload for the vehicle action 130. If not, the arbitration block 125 may transmit a signal to the coordination controller 120 representing that one or more of the components 110 or power supplies 115 has failed. In some instances, the arbitration block 125 may represent hardware the links the mechanical output of the components 110 to the vehicle action 130 (e.g., a mechanical linkage that permits two or more actuators to actuate a steering wheel, a brake pedal, or an accelerator pedal).

Figure 3:
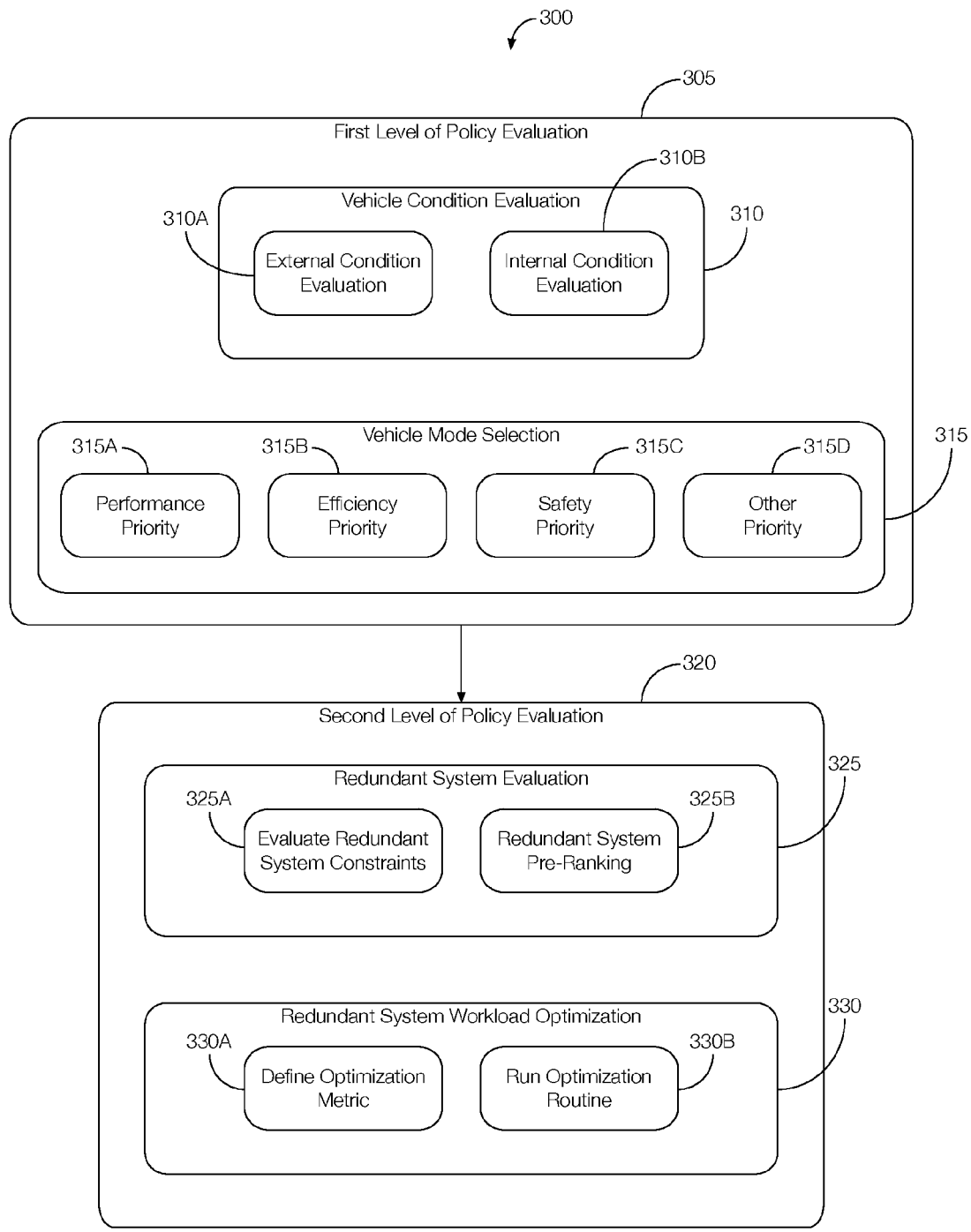
FIG. 3 is a diagram illustrating different levels of policy evaluation performed by the workload allocation system to coordinate the workload between multiple vehicle subsystems.

FIG. 3 is a diagram 300 illustrating different levels of policy evaluation considered by the coordination controller 120. The first level of policy evaluation 305 includes evaluating vehicle conditions 310 and selecting a vehicle mode 315. Evaluating vehicle conditions 310 includes evaluating external conditions 310A and internal conditions 310B. Examples of external vehicle conditions 310A may include a traffic condition, an ambient temperature, and a distance to a destination, as discussed above. Examples of internal vehicle conditions 310B may include a driver condition, a vehicle traction capability, and a power capability, as previously discussed. Selecting the vehicle mode may include selecting among the performance priority 315A, the efficiency priority 315B, the safety priority 315C, or another priority 31D. After evaluating the conditions and selecting the vehicle mode, the coordination controller 120 may proceed to the second level of policy evaluation 320.

The second level of policy evaluation 320 may include evaluating redundant systems 325 and optimizing the workload 330. Evaluating the redundant systems may include considering the redundant system constraints 325A and pre-ranking the redundant systems 325B. Considering the system constraints 325A may include considering the power capabilities of the power supplies 115 and how much of the workload a particular component 110 can handle. Pre-ranking the components 325B may include prioritizing which components 110 and power supplies 115 are best able to perform the vehicle action 130 given a particular failure. Thus, the pre-ranking 325B could include the coordination controller 120 ranking the components 110 according to the power capacity of the power supply 115 Associated with a particular component 110, the maximum possible workload of the component 110 for a particular vehicle action 130, or the like.

Optimizing the workload 330 may include the coordination controller 120 defining the optimization metric 330A and running the optimization routine 330B. Defining the optimization metric may include allocating the workloads of one or more components 110 to complete the vehicle action 130 according to the vehicle condition evaluation 310, the vehicle mode selection 315, and the redundant system evaluation 325. As discussed above, defining the optimization metric 330A could include reducing the workload of a failed component 110 And increasing the workload of another component 110. In some instances, the coordination controller 120 may reduce the workload of the failed component 110 to a non-zero value if the failed component 110 is still able to contribute to the vehicle action 130. Running the optimization routine 330B includes outputting control signals to the components 110 and power supplies 115 performing the vehicle action 130 that command those components 110 and power supplies 115 to operate according to the workload allocation defined by the optimization metric 330A.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a first vehicle component at least partially controlling a vehicle action;
a second vehicle component at least partially controlling the vehicle action; and
a coordination controller programmed to coordinate control of the vehicle action, wherein the coordination controller is programmed to detect a first vehicle component failure, select a vehicle priority from among a performance priority, an efficiency priority, and a safety priority, select a vehicle mode according to the selected vehicle priority, and allocate workloads of the first vehicle component and the second vehicle component according to the selected vehicle mode.

2. The vehicle system of claim 1, further comprising:
a first power supply electrically connected to the first vehicle component; and
a second power supply electrically connected to the second vehicle component,
wherein the coordination controller is programmed to monitor a power capability of the first power supply and the second power supply.

3. The vehicle system of claim 2, wherein the coordination controller is programmed to detect the first vehicle component failure based on the power capability of the first power supply.

4. The vehicle system of claim 1, wherein allocating the workload of the first vehicle component includes reducing the workload of the first vehicle component and wherein allocating the workload of the second vehicle component includes increasing the workload of the second vehicle component.

5. The vehicle system of claim 1, wherein allocating the workloads of the first vehicle component and the second vehicle component identifying constraints associated with at least one of the first vehicle component and the second vehicle component and allocating the workloads of the first vehicle component and the second vehicle component according to their respective constraints, wherein each of the constraints include a power capacity of a power supply servicing at least one of the first vehicle component and the second vehicle component.

6. The vehicle system of claim 1, wherein allocating the workloads of the first vehicle component and the second vehicle component includes controlling the first vehicle component and the second vehicle component to operate in accordance with the selected vehicle mode.

7. The vehicle system of claim 6, wherein controlling the first vehicle component and the second vehicle component to operate in accordance with the selected vehicle mode includes outputting control signals to at least one of the first vehicle component and the second vehicle component, the control signals commanding at least one of the first vehicle component and the second vehicle component to operate in accordance with the workload.

8. The vehicle system of claim 1, wherein the coordination controller is programmed to detect the first vehicle component failure based on at least one internal vehicle condition.

9. The vehicle system of claim 8, wherein the at least one internal vehicle condition includes at least one of a driver condition, a vehicle traction capability, and a power capability.

10. The vehicle system of claim 1, wherein the coordination controller is programmed to detect the first vehicle component failure based on at least one external vehicle condition.

11. The vehicle system of claim 10, wherein the at least one external vehicle condition includes a traffic condition, an ambient temperature, and distance to a destination.

12. A vehicle system comprising:
a first vehicle component at least partially controlling a vehicle action;
a second vehicle component at least partially controlling the vehicle action;
a first power supply electrically connected to the first vehicle component;
a second power supply electrically connected to the second vehicle component; and
a coordination controller programmed to coordinate control of the vehicle action, wherein the coordination controller is programmed to detect a first vehicle component failure, select a vehicle priority from among a performance priority, an efficiency priority, and a safety priority, and select a vehicle mode according to the selected vehicle priority, and allocate workloads of the first vehicle component and the second vehicle component according to the selected vehicle mode.

13. The vehicle system of claim 12, wherein the coordination controller is programmed to monitor a power capability of the first power supply and the second power supply and detect the first vehicle component failure based on the power capability of the first power supply.

14. The vehicle system of claim 12, wherein allocating the workload of the first vehicle component includes reducing a workload of the first vehicle component and wherein allocating the workload of the second vehicle component includes increasing a workload of the second vehicle component.

15. The vehicle system of claim 12, wherein allocating the workloads of the first vehicle component and the second vehicle component identifying constraints associated with at least one of the first vehicle component and the second vehicle component and allocating the workloads of the first vehicle component and the second vehicle component according to their respective constraints, wherein each of the constraints include a power capacity of at least one of the first power supply and the second power supply.

16. The vehicle system of claim 12, wherein allocating the workloads of the first vehicle component and the second vehicle component includes controlling the first vehicle component and the second vehicle component to operate in accordance with the selected vehicle mode.

17. The vehicle system of claim 16, wherein controlling the first vehicle component and the second vehicle component to operate in accordance with the selected vehicle mode includes outputting control signals to at least one of the first vehicle component and the second vehicle component, the control signals commanding at least one of the first vehicle component and the second vehicle component to operate in accordance with a workload.

18. The vehicle system of claim 12, wherein the coordination controller is programmed to detect the first vehicle component failure based on at least one internal vehicle condition and at least one external vehicle condition.

19. The vehicle system of claim 18, wherein the at least one internal vehicle condition includes at least one of a driver condition, a vehicle traction capability, and a power capability.

20. The vehicle system of claim 18, wherein the at least one external vehicle condition includes a traffic condition, an ambient temperature, and distance to a destination.

* * * * *